Aug. 4, 1953

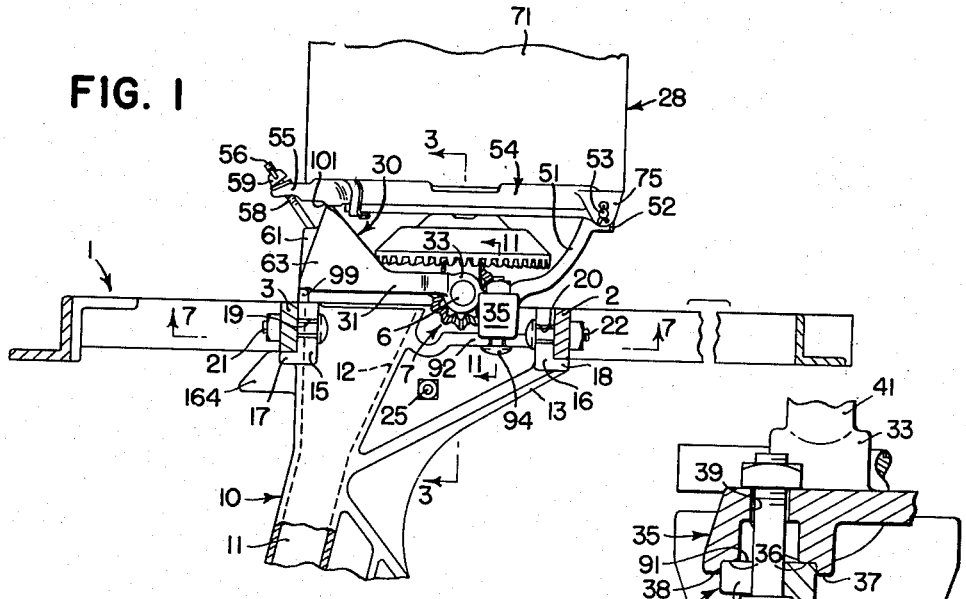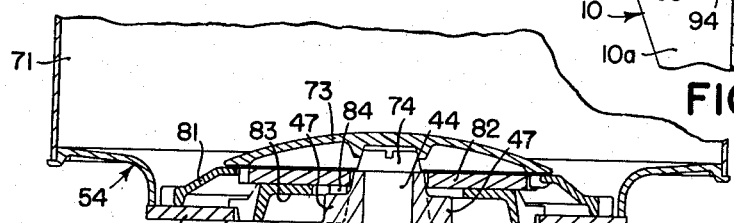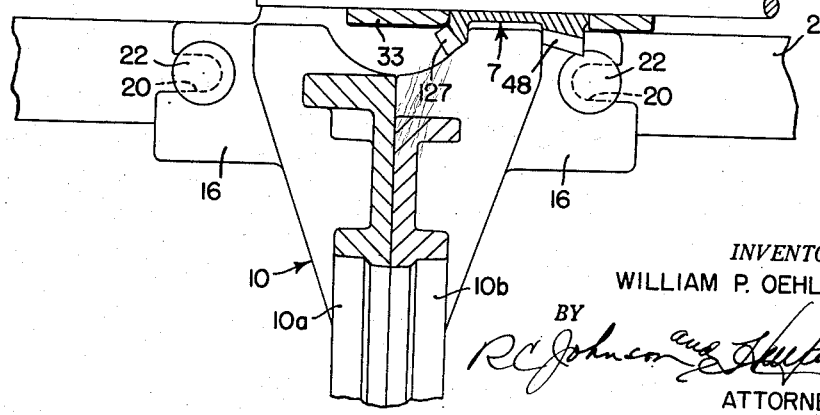

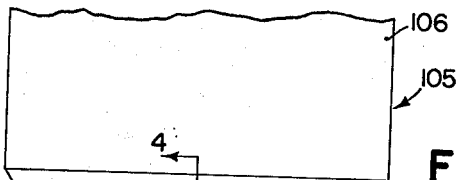
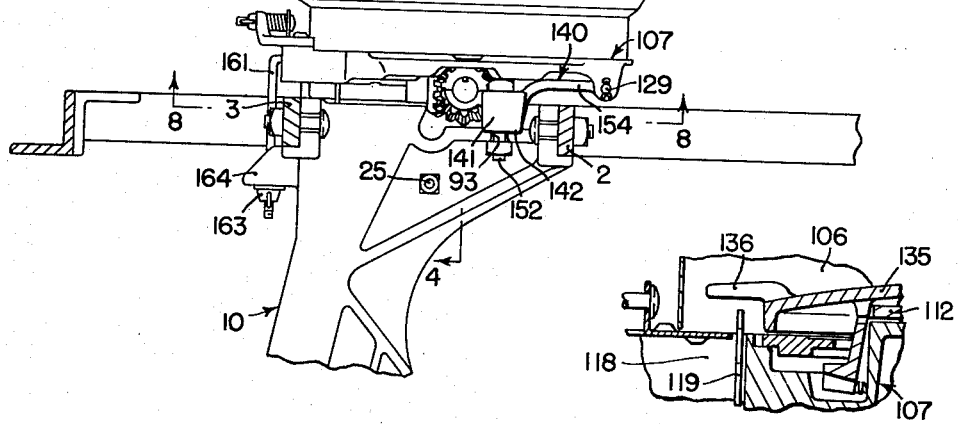
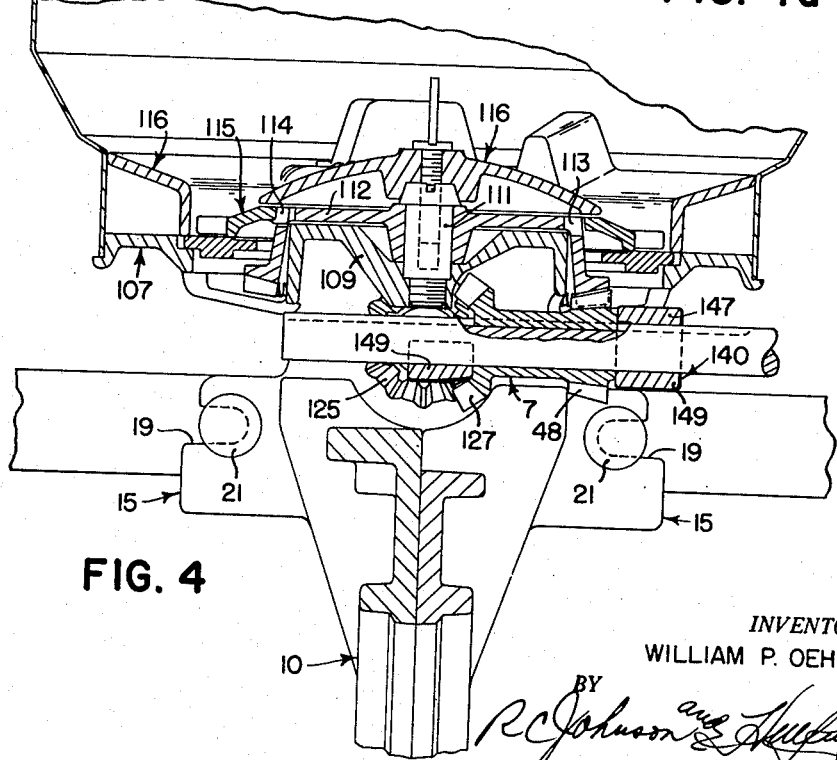

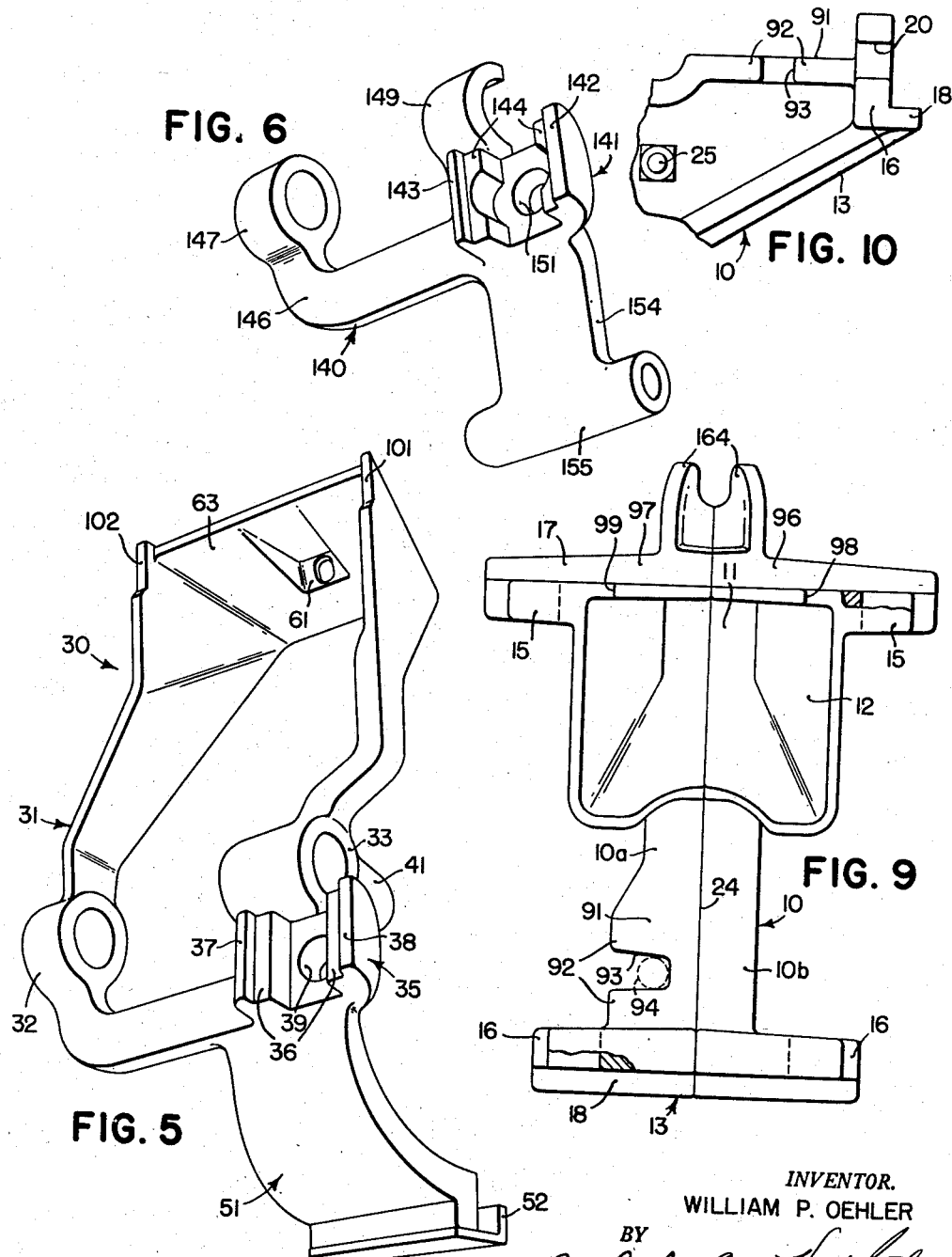

W. P. OEHLER 2,647,662

PLANTER CONSTRUCTED TO ACCOMMODATE VARIOUS TYPES OF HOPPERS

Filed May 18, 1949

INVENTOR.
WILLIAM P. OEHLER
BY
ATTORNEYS

Patented Aug. 4, 1953

2,647,662

UNITED STATES PATENT OFFICE 2,647,662

PLANTER CONSTRUCTED TO ACCOMMODATE VARIOUS TYPES OF HOPPERS

William P. Oehler, Moline, Ill., assignor to Deere & Company, Moline, Ill., a corporation of Illinois Application May 18, 1949, Serial No. 94,022

7 Claims. (Cl. 222—185)

The present invention relates generally to agricultural implements and more particularly to planters.

The object and general nature of the present invention is the provision of a new and improved planter especially constructed and arranged to accommodate different kinds of hoppers and seeding mechanisms, whereby with a minimum number of parts, the planter may be arranged for operation under widely different conditions. More specifically, it is a feature of this invention to provide a planter in which, with a minimum number of parts, the planter may be arranged for use with corn hoppers, in which corn only may be planted, or with combination cotton and corn hoppers in which either corn or cotton seed may be planted according to the way the seed plates are arranged in the cotton and corn hopper.

More particularly, it is a feature of this invention to provide a shank and hopper support construction wherein the upper portion of the seed-receiving planter shank is especially constructed to function with either of two types of hopper supports, one particularly adapted for use with a corn hopper and the other particularly adapted for use with a combination cotton and corn hopper.

These and other objects and advantages of the present invention will be apparent to those skilled in the art after a consideration of the following detailed description, taken in conjunction with the accompanying drawings, in which:

Figure 1 is a side view of the shank and associated parts of a planter in which the principles of the present invention have been incorporated, the shank and its adapter casting being constructed and arranged to receive and support a corn hopper;

Figure 2 is a view similar to Figure 1 showing a combined cotton and corn hopper and its adapter casting supported on the same shank shown in Figure 1;

Figure 3 is a sectional view taken generally along the line 3—3 of Figure 1, showing the corn hopper adapter casting or support in hopper-receiving position;

Figure 4 is a sectional view taken generally along the line 4—4 of Figure 2, showing the combination cotton and corn hopper adapter casting or support in hopper-receiving position;

Figure 4a is a fragmentary view, similar to Figure 4, showing the hopper seeding mechanism arranged for planting cotton, the parts shown in Figure 4 being arranged for planting corn;

Figure 5 is a perspective view looking at the under side of the adapter casting for supporting a corn hopper on the planter shank;

Figure 6 is a similar perspective view showing the adapter casting for supporting the combination cotton and corn hopper on the shank;

Figure 9 is a fragmentary plan view, showing the upper portion of the shank;

Figure 10 is a fragmentary view showing the right side of the shank; and

Figure 11 is a fragmentary sectional view taken along the line 11—11 of Figure 1.

Figure 8:
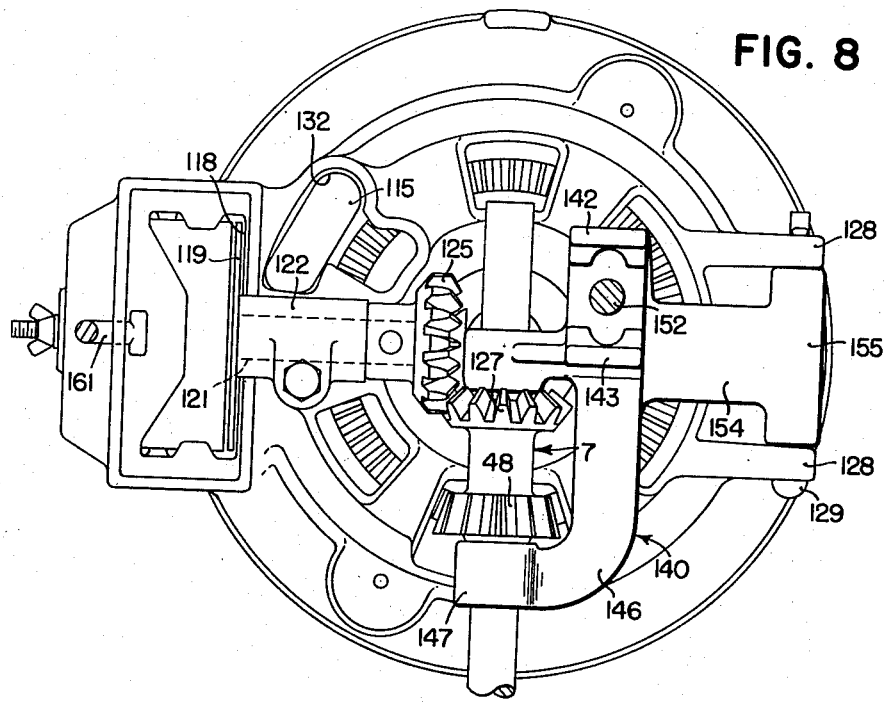
Figure 8 is a view similar to Figure 7, showing the under side of a combination cotton and corn hopper, together with portions of the seeding mechanism.
Figure 7:
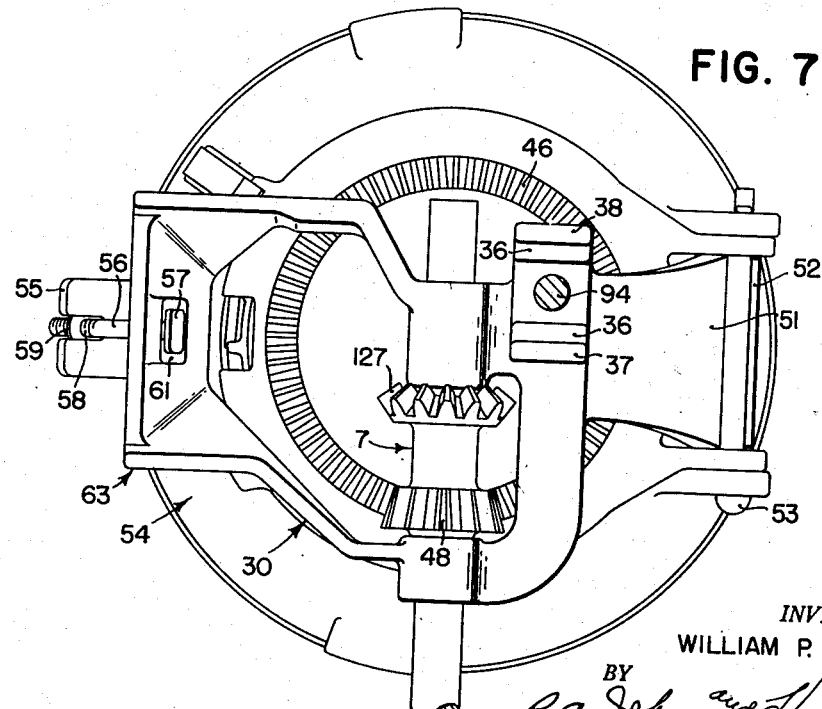
Figure 7 is a view taken generally along the line 7—7 of Figure 1, showing the under side of a corn hopper and a portion of the associated seeding mechanism.

Referring now to the drawings, particularly Figure 1, the planter frame is indicated in its entirety by the reference numeral 1 and comprises front and rear angle frame bars, one or more cross bars, and a pair of transverse central bars 2 and 3, one of which carries bearing means in which a transverse seeding shaft 6 is supported at its intermediate portion in said bearing means, where the planter is a two-row planter. Each end of the transverse seeding shaft 6 carries a compound pinion member 7 which, so far as the present invention is concerned, is substantially identical with the pinion shown in the U. S. patent to White 2,360,028, dated October 10, 1944. According to the principles of the present invention, the planter is provided with a shank so constructed and arranged to receive and support either a corn hopper or a combination cotton and corn hopper, as desired, and the shank construction will now be described.

The shank, which is indicated in its entirety by the reference numeral 10, comprises a generally tubular member having an interior seed tube or chute 11 formed at its upper end in upwardly diverging or outwardly flared configuration, as indicated by the reference numeral 12. The shank 10 also includes a forwardly extending portion 13, and the rear portion at the upper end of the shank 12 is formed with laterally directed attaching lugs 15 while the forward portion of the extension 13 is provided with a pair of similar laterally directed attaching lugs 16. The lugs 15 and 16 are generally L-shaped in section, forming lower flanges 17 and 18 by which the lugs may be readily secured and properly positioned relative to the frame bars 2 and 3. The lugs 15 and 16 are provided with open end slots 19 and 20 to receive bolts 21 and 22 which securely fix the upper portion of the shank 10 to the planter frame.

As best shown in Figure 9, the shank 10 is formed as two complementarily mating sections 10a and 10b joined together along a generally central mating line 24. The two shank sections are rigidly connected together by one or more clamping bolts 25. As best shown in Figure 1, the shank 10 is adapted to receive and support a corn hopper 28 through a corn hopper adapter casting or hopper support member indicated in its entirety by the reference numeral 30. The adapter casing or hopper-supporting member 30 comprises a divided central portion 31 which includes two laterally spaced bearing sleeve sections 32 and 33 adapted to receive the outer or associated end of the seeding drive shaft 6. The central portion 31 of the adapter casting 30 is also provided with a shank-receiving attaching lug 35 formed with a pair of spaced apart downwardly facing flattened sections 36 which at their outer sides terminate in downwardly extending flanges 37 and 38, disposed on opposite sides of a central bolt-receiving portion 39. Adjacent the latter opening is an upwardly extending lugs 41 tapped, as at 42, to receive a stud bolt 44 which serves as a bearing support for a gear 45 which is formed as a bell-shaped member having a lower set of gear teeth 46 and an upper set of lugs 47 which serve to drive the seeding mechanism of the corn hopper. The teeth 46 are adapted to mesh with a pinion section 48 of the drive pinion member 7.

At one end of the hopper support member or adapted casting 30 there is an upwardly and outwardly disposed extension 51 carrying a hook section 52 and thereby adapted to receive the hinge pin 53 of the hopper bottom, which is indicated in its entirety by the reference numeral 54 and which will be described in more detail below. The hopper bottom 54 includes a notched lug 55 in which a clamping bolt 56 is adapted to be received. The bolt 56 has a head 57 on the lower end and at its upper end a threaded portion 58 on which a thumb nut 59 is disposed. The headed end of the bolt 56 is adapted to be received in a rear apertured portion 61 formed in the rear wall of the adapter casting member 30. The rear wall just mentioned forms a part of a rearwardly disposed shroud section 63 of the member 30 which is disposed generally above the mouth section 12 of the shank 10 whereby seed delivered by the seed-selecting mechanism of the corn hopper is delivered into the chute portion 11 without being deflected by air currents or the like.

The corn hopper, which is adapted to be mounted on the shank 10 by means of the adapter member 30, is of conventional construction, so far as the present invention is concerned, and hence a brief description will suffice. The corn hopper is indicated in its entirety by the reference numeral 28 and comprises a can or container 71 fixed at its lower end on the hopper bottom member 54. The latter member includes a central domed portion 73 shaped to receive and be centered by the tapered head 74 of the bolt 44 on the upper portion of the tapped lug 41 on the adapter casting 30. The hopper base member 54 carries a pair of apertured ears 75 which receive the hinge pin 53. Mounted on the hinge pin 53 is a false plate 77 held in place by a retainer spring 78, and between the false plate 77 and the base member 54 are disposed the seed plate 81, the drive plate 82 which has a driving connection with the seed plate 81, and the drive plate retainer 83. The drive plate 82 is driven by a set of depending lugs 84 on the lower side which are adapted to be engaged by the lugs 47 on the bevel gear 45. This construction is substantially the same as the seed plate arrangement shown in the U. S. patent to White 2,340,163, issued January 25, 1944, to which reference may be made if desired.

The flat portion 36 of the adapter casting 30 is adapted to fit down against the upper flat portion 91 of a lug 92 which forms a part of the upper portion of the right hand shank part 10a. The lug 92 is slotted, as at 93, to receive the head portion of a bolt 94 which is adapted to extend upwardly through the opening 39 in the adapter casting 30, and when the bolt 94 is tightened the adapter casting 30 is firmly fixed to the upper edge of the shank 10. The member 30 is held against angular displacement by the engagement of the flanges 37 and 38 with the sides of the flattened shank portion 91 generally opposite the slotted aperture 93 in the shank member 10a. The rear walls 96 and 97 of the shank halves 10a and 10b are notched, as at 98 and 99, to receive lugs 101 and 102 formed on the rear wall 63 of the adapter casing 30, whereby the rear portion of the latter is held in interlocked relation with the upper end of the shank 10 so long as the bolt 94 is tight.

By loosening the bolt 94 the corn hopper and its adapter member 30 may be removed from the shank and the parts incident to the use of the combination cotton and corn planter attached in lieu thereof. The specific details per se of the combination cotton and corn hopper, which is indicated in its entirety by the reference numeral 105, do not form any part of the present invention, and hence a brief description will suffice. The hopper construction 105 comprises a hopper container 106 fixed at its lower end to a hopper base member 107 which is provided with a central section 109 tapped to receive a stud 111 on which a gear member 112 is mounted for rotation. The latter member has lugs 113 which are adapted to engage with lugs 114 on a corn seed plate 115. Over the latter is a corn cut-off plate 116. The base member 107 is provided at one side with a cotton discharge opening 118 in which a picker wheel 119 is mounted for rotation. The wheel 119 is fixed to the outer end of a picker wheel shaft 121 which is journaled by bearing means 122 on the hopper base member 107. The inner end of the shaft 121 receives a pinion 125 for driving the picker wheel, the pinion 125 being adapted to mesh with the laterally inner pinion section 127 of the associated compound pinion member 7 on the shaft 6. The hopper base member includes a pair of apertured ears 128 which are spaced apart to receive a hinge pin 129 by which the hopper 105 may be mounted on a hopper-supporting adapter casting 130 to which reference is made below. The hopper bottom 107 is provided with an aperture 132 through which corn from the cells of the seed plate 115 are adapted to be delivered, the parts being so arranged that the opening 132 is over the mouth 12 of the shank 10. Similarly, the cotton discharge opening 118 is also disposed above the mouth 12 of the shank 10 so as to deliver cotton seed thereto.

As best shown in Figure 4a, when the cotton seed is to be planted, the corn cut-off plate 116 is removed and a cotton seed plate 135 is connected to rotate with the driving member 112 and is adapted to replace the corn seed plate 115, the cotton seed plate having outwardly extending teeth 136 for feeding the cotton seed to the picker wheel 119.

The hopper-supporting part or adapter casting for receiving and supporting the combination cotton and corn hopper 105 is indicated in its entirety by the reference numeral 140 and, as best shown in Figure 6, comprises a central portion 141 having a laterally spaced pair of flanges 142 and 143 on opposite sides of a flat section 144 that is adapted to engage the corresponding flat portion 91 on the shank 10. The member 141 is provided with an arm extension 146 which is formed to serve as a bearing sleeve 147 to receive and support the end of the seeding shaft 6. The central portion of the adapter casting 140 has a recessed lug 149 which also receives and supports the shaft 6. The central flat section 144 of the adapter casting 140 is apertured, as at 151, to receive a mounting bolt 152, the head portion of which is adapted to be disposed in the slotted portion 93 at the upper end of the shank 25 and serving when tightened to fix the cotton and corn hopper receiving member 140 to the upper end of the shank 10 in such a position that seed from either the picker wheel or the corn seed plate may readily be directed by the shank 10. The mounting member 140 has a forward extension 154 which at its forward end is formed with a sleeve section 155 adapted to receive the hopper hinge pin 129, which disposes the hopper bottom in the proper position to discharge either corn seed or cotton seed into the seed tube or chute 11 of the shank 10. In this form of construction, a bolt 161 is pivoted in an aperture formed in a wall portion of the hopper bottom section 107. The outer end of the bolt 161 is threaded and receives a lock nut 163. The bolt 161 is adapted to be disposed between a pair of lugs 164 on the rear side of the shank 10, whereby when the thumb nut 163 is tightened the combination cotton and corn hopper is firmly fixed in position.

By virtue of the particular construction of the shank and the construction of the associated hopper supports or adapter castings, I am able to readily interchange the adapter castings and thus enable the planter to be equipped with either the corn hoppers or the combination cotton and corn hoppers, each supported on substantially the same shank construction.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. For use in a planter of the type which includes a frame, a seeding shaft and a seed hopper having seeding mechanism adapted to be driven from said shaft, a shank and hopper support construction comprising a shank having a seed chute adapted to receive seed from said seeding mechanism, means for connecting said shank to said frame to be supported by the latter, a hopper-supporting part, means for detachably connecting said part to said shank to be supported by the latter, one portion of said seeding shaft being supported for rotation in said frame, said hopper-supporting part including hopper-receiving means and a bearing section adapted to receive another portion of said seeding shaft and to position said other portion of the seeding shaft so as to drive the seeding mechanism of said hopper.

2. For use in a planter of the type which includes a seeding shaft and a seed hopper having seeding mechanism adapted to be driven from said shaft, a shank and hopper support construction comprising a shank having a seed chute adapted to receive seed from said seeding mechanism, a hopper-supporting part attachable to the upper end of said shank and detachable therefrom, said hopper-supporting part including hopper-receiving means and a bearing section adapted to receive said seeding shaft and to position the same so as to drive the seeding mechanism of said hopper, the upper portion of said shank having a flattened section and said hopper-supporting part also having a flattened section adapted to engage and rest on the flattened section of said shank, means for holding said flattened sections together so as to fix said hopper-supporting part to said shank, and interconnecting means on said shank and said hopper-supporting part adjacent said flattened sections for preventing displacement of said hopper-supporting part relative to said shank generally in the plane of said flattened sections.

3. The invention set forth in claim 2, further characterized by said interconnecting means including a pair of laterally spaced, downwardly extending flanges adapted to engage said shank at opposite sides of the flattened section of said shank, and said means for fixing the hopper-receiving part to the upper portion of the shank serving to hold the flanges of said part in engagement with said shank at opposite sides thereof.

4. The invention set forth in claim 3, further characterized by said shank and hopper-receiving part being apertured in the flattened sections thereof, and the means for fixing the hopper-receiving part to said shank comprising bolt means extending through said apertures.

5. The invention set forth in claim 3, further characterized by the upper portion of said shank having a laterally directed slot extending into the flattened section of said shank, and said hopper-receiving part having an aperture in the flattened section thereof, and said means for fixing said hopper-receiving part to said shank comprising a bolt disposable in the aperture in said part and connectible to the upper portion of said shank by movement through said slot, whereby said hopper-receiving part may be attached to said shank by movement into position thereon from one side of said shank.

6. In a planter of the type including a frame having spaced-apart frame bars, a seeding mechanism drive shaft carried by said frame and having a pinion mounted on said shaft, and a hopper including a hopper bottom having seeding means including a gear adapted to be driven by said pinion, the improvements comprising a shank having front and rear sections adapted to fit against said frame bars, a seed chute, and an attaching section adapted to receive a hopper-supporting part, said hopper-supporting part provided with a bearing section adapted to receive said shaft and a shank-engaging portion formed complementarily with respect to the support-receiving portion of said shank, said shank-engaging and support-receiving portions having laterally spaced apart, overlapping sections serving to prevent any angular and lateral displacement of the hopper-supporting part relative to the attaching section of said shank, said hopper-supporting part including an extension adapted to receive the hopper in a position so that the seeding mechanism thereof may be driven by the pinion on said seeding shaft when the latter is received in said bearing portion, and means for fixing said hopper-receiving part to said shank with said complementarily formed portions in supporting registration.

7. The invention set forth in claim 6, further characterized by said hopper-receiving part having an upwardly extending gear-supporting means, and a gear mounted on said support for attachment to and disconnection from said shank with said hopper-supporting part, said gear being adapted to be driven by said pinion when said shaft is supported in the bearing portion of said hopper-receiving part, said gear having means for driving the seeding mechanism of the hopper supported on said hopper-supporting part.

WILLIAM P. OEHLER.

References Cited in the file of this patent

UNITED STATES PATENTS

| Number | Name | Date |
| --- | --- | --- |
| 291,183 | Gere | Jan. 1, 1884 |
| 462,542 | Evans | Nov. 3, 1891 |
| 829,112 | Lathrop | Aug. 21, 1906 |
| 2,383,413 | Orendorff | Aug. 21, 1945 |